March 26, 1940.  E. J. SCHAEFER  2,195,287
REVERSING SINGLE PHASE MOTOR
Filed March 9, 1938
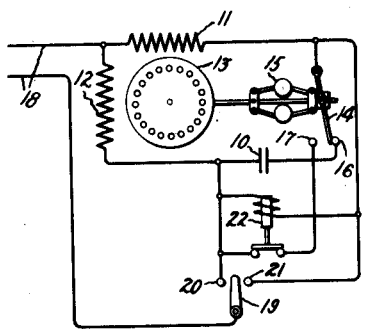
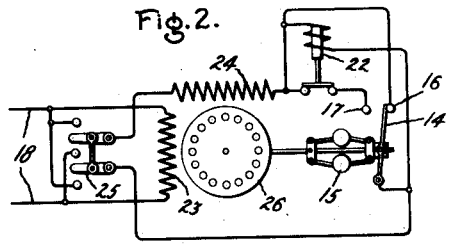
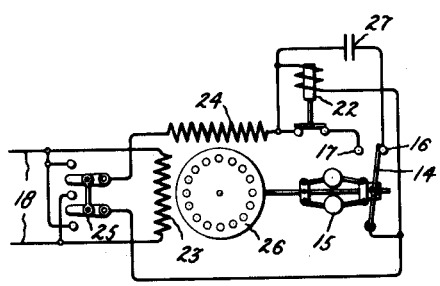
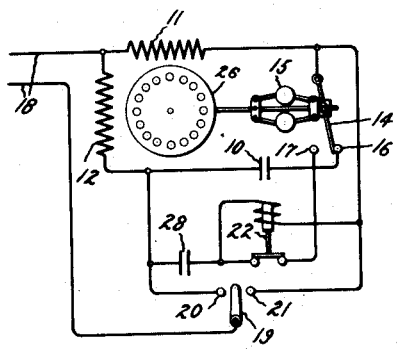
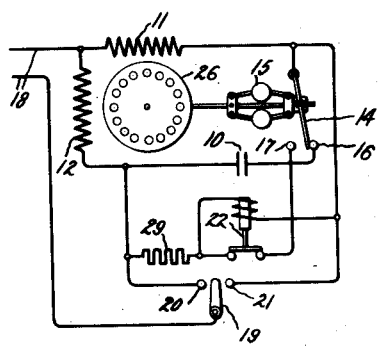
Inventor:
Edward J. Schaefer,
by Harry E. Dunham
His Attorney.

Patented Mar. 26, 1940

2,195,287

UNITED STATES PATENT OFFICE 2,195,287

REVERSING SINGLE PHASE MOTOR

Edward J. Schaefer, Fort Wayne, Ind., assignor to General Electric Company, a corporation of New York Application March 9, 1938, Serial No. 194,867

11 Claims. (Cl. 172—278)

My invention relates to reversing motors of the single phase split phase type, and its object is to provide means whereby standard single phase motor installations may be made reversing in a simple manner.

Single phase split phase motors generally employ an automatic speed responsive switch for cutting out or modifying the starting winding circuit connections as the motor comes up to speed. My invention relates to a reversing scheme for such motors in which, assuming the motor to be operating at full speed in one direction, a reversing switch may be thrown to immediately start reversing the motor without the necessity of waiting for the automatic starting switch to function to reconnect the starting winding for starting conditions. This is preferably accomplished by a quick acting relay associated in short-circuiting relation with the customary automatic speed responsive starting switch. I may also make use of negative torque motor characteristics in quickly bringing the motor to rest in such reversing operations.

The features of my invention which are believed to be novel and patentable will be pointed out in the claims appended hereto. For a better understanding of my invention reference is made in the following description to the accompanying drawing in which Fig. 1 represents a capacitor start split phase motor which has a high resistance rotor for producing a negative damping torque to assist in quick reversing; Fig. 2 represents an internal resistance split phase reversing motor; Fig. 3 represents a capacitance start motor which employs internal resistance split phase characteristics to assist in reversing; Fig. 4 illustrates a capacitance start and capacitance reversing motor and Fig. 5 illustrates a capacitance start motor using an external resistance phase splitter to assist in reversing.

In Fig. 1 I have shown my invention as applied to a single phase motor in which a capacitor 10 is used for splitting the phase for starting purposes. The primary windings 11 and 12 of the motor are axially displaced preferably 90 mechanical degrees so as to produce fluxes in quadrature axes and those windings will preferably be alike or substantially alike in number of turns and in resistance. The rotor 13 is an induction secondary of the high resistance squirrel cage type. A speed responsive switch 14 is represented as being operated by a centrifugal device 15, but any usual form of switch which is operated automatically in response to the speed condition of the motor may be used. The switch 14 is shown in the starting position on starting contact 16 which corresponds to its position when the motor is at rest and when operating below the speed at which the starting winding is normally disconnected. When the motor is up to normal speed contact 14 rests on a running contact 17.

The line terminals of the motor are indicated at 18, one line connection going directly to one end of both primary windings and the other line connection going to the movable blade 19 of a two way switch which serves both as an energizing switch and as a reversing switch. One stationary contact 20 of this switch goes to the other end of primary winding 12 and the other stationary contact 21 of this reversing switch connects with the other end of the other primary winding 11. The speed responsive switch 14—16 and the phase splitting condenser 10 are also connected between the last two mentioned ends of windings 11 and 12. Thus, if we omit contact 17 of the speed responsive switch and consider only the parts already described we have an ordinary split phase reversing motor having the primary windings connected in parallel circuits at starting speeds. If switch 19 is closed on contact 20 the motor will start using winding 11 as the starting winding and 12 as the main winding. When up to about 75% full speed winding 11 and the condenser 10 will be cut out at contact 16. If, however, switch 19 had been thrown to contact 21 the motor would have started in the opposite direction and winding 12 would have become the starting winding and 11 the main winding and switch 19 would have cut out winding 12 as the motor came up to speed. The motor will function as above described without the quick acting relay indicated at 22 but in such case it is necessary, in reversing the motor, to first open switch 19 and wait until the motor slows down to a speed where the speed responsive switch 14 closes on starting contact 16 before again energizing the motor for the reverse direction of rotation. Otherwise the motor would continue to operate single phase in the same direction. According to my invention with relay 22 and its connections, the motor may be operating full speed in either direction and the switch 19 quickly thrown to the opposite contact 20 or 21 without waiting for the motor to slow down and the motor will reverse and, moreover, will reverse much more quickly than with the prior described arrangement because of a powerful braking action while stopping.

Relay 22 has its coil connected across the speed responsive switch 14 and condenser 10, or across the contacts of the relay and speed responsive switches, or across those ends of windings 11 and 12 which are not connected directly to the common line terminal. For convenience we may call these ends of windings 11 and 12 the control ends. When this relay is deenergized, it is biased to a closed position and it closes its contacts to establish a circuit from running contact 17 of the speed responsive switch to the control end of primary winding 12. Hence, when the motor is up to speed and relay 22 is deenergized, the relay and the speed responsive switch serves to directly connect the control ends of the primary windings 11 and 12, omitting the condenser 10 from this connection.

The operation of the apparatus including the relay 22 and contact 17 will now be described. The positions of the switches as shown in Fig. 1 are their positions when the motor is deenergized and the motor is at rest. To start in one direction, switch 19 is closed on contact 20 and to start in the reverse direction, it is closed on contact 21. Let us assume we close switch 19 on contact 20. This puts winding 12 directly across the line and winding 11 with condenser 10 in series in parallel with winding 12 across the line. As soon as the motor is energized relay 22 is also energized, due to the voltage across condenser 10, and opens its contacts, although the circuit through the relay contacts is already open at contact 17 of the speed responsive switch.

The motor starts in the selected direction of rotation and at the proper speed the movable speed responsive switch 14 opens the starting winding circuit at starting contact 16 and moves to running contact 17. Relay 22 remains energized because it is now connected across line 18 through otherwise idle winding 11. The relay prevents the establishment of the negative torque connection at running speeds except when the reversing switch is operated. Hence, the motor now runs single phase on winding 12 in the usual manner. If the motor slows down due to overload, the centrifugal switch will reconnect the starting winding condenser circuit in again generally at around 60% of full speed and if it is desired to stop the motor switch 19, is simply moved to open position and hence, the operation is normal in these respects. With switch 19 on contact 20 and the motor in normal single phase operation the motor is reversed by moving switch 19 to contact 21 without the necessity of any hesitation in so doing. The instant that switch 19 leaves contact 20, the quick acting relay 22 is deenergized and closes its contacts. Relay 22 is energized through switch 19 and is thus responsive to the opening of this switch. Switch 19 is closed on contact 21. This happens before the motor has slowed down to any appreciable extent and hence, both motor windings 11 and 12 are connected in parallel directly across the line 18, winding 12 being connected through switch 14, contact 17 and the closed contacts of relay 22. Relay 22 remains deenergized because its coil is now short circuited by its own contacts through switch 14 in the high speed position on contact 17. As thus connected the motor has a substantial negative torque tending to slow it down. The magnitude of this negative torque and the speed to which it will slow down under the described conditions depends upon the resistance of the rotor winding. A motor with equal windings spaced 90 degrees and with an ordinary low resistance rotor running normally on one winding will, when the second winding is connected in parallel, have negative torque down to about 75% of synchronous speed. If the rotor resistance is increased to a value about four times that of a normal low resistance rotor, the range at which negative torque is produced, with both windings in parallel without phase split, may be increased down to 50% of synchronous speed which is generally below the speed where the speed responsive switch closes on the starting contact. It is only necessary that the negative torque reduce the speed of the motor to the point where the speed responsive switch will return to low speed or starting position.

Hence, the motor reduces speed very quickly and speed responsive switch leaves contact 17 and moves to starting contact 16. As soon as contact 17 is opened a voltage again appears across the coil of relay 22 and it picks up and opens its contacts. When the speed responsive switch closes on contact 16, condenser 10 is connected in series with winding 12 across the line in parallel with winding 11 and a powerful reversing torque reverses the motor and brings it up to speed in the opposite direction. At the proper speed the speed responsive switch 14 cuts out the condenser and now starting winding 12 and the motor runs single phase on winding 11 in the usual manner.

The reversing of the motor by throwing switch 19 from contact 21 to 20 establishes the same electric braking of negative torque conditions as previously described and the reversing operation is in other respects the same as described above. If the two primary windings of the motor are exactly alike, the reversing characteristics of the motor will be exactly similar for both directions. However, there may be a substantial difference in these two windings without rendering the scheme inoperative.

Fig. 2 represents the invention as applied to the usual split phase motor where the primary windings are materially different. In this case 23 represents the main or running winding and 24 the starting winding for both directions of rotation. Reversing is accomplished by a switch 25 for reversing the starting winding 24. Either winding may be reversed, but in reversing it is required that the relay 22 be momentarily deenergized. 26 represents an ordinary low resistance squirrel cage rotor. The speed responsive switch 14 and the quick acting relay 22 are the same as in Fig. 1 and are connected essentially in the same way, although the external phase splitting device 10 of Fig. 1 is not used and phase splitting is obtained by using windings having different time constants such as by means of a high resistance winding 24.

In Fig. 2 the switches are represented in the positions they will assume when the motor is at rest and deenergized. To start the motor in one direction the line 18 is energized and switch 25 closed, say upward. The motor starts as a resistance split phase motor. At the proper speed, switch 14 opens the starting winding 24 circuit at contact 16. Quick acting relay immediately picks up and opens its contacts before switch 14 reaches running contact 17. This relay is energized whenever a voltage exists across the contacts of the relay and speed responsive switches. Single phase operation is then obtained on winding 23 alone.

To reverse, switch 25 is thrown to the down position. During this switching operation relay 22 is deenergized and closes its contact. It is a quick acting relay of low inertia and hence, closes its contacts even though switch 25 is very quickly reversed. Winding 24 is thus again connected in circuit, but now through the contacts of relay 22, contact 17 and speed responsive switch 14. Relay 22 remains deenergized at this time because its coil is short-circuited until switch 14 moves off of the running contact 17.

The reversing of switch 25 thus leaves the motor running approximately full speed but in a direction which is the reverse of that for which its windings are connected. The motor will then be subject to a powerful reversing torque which will quickly slow it down through a speed where the circuit of winding 24 is momentarily opened when switch 14 moves from contact 17 to contact 16 after which the same reversing connections are again established and the motor reverses and starts in the opposite direction. At the proper increase in speed switch 14 moves from contact 16 to contact 17 and opens the circuit of starting winding 24. Relay 22 picks up before switch 14 reaches contact 17. Normal single phase operation on winding 23 alone is resumed.

The operating performance of the speed responsive and relay switches is independent of the direction of rotation. The reversing operations in the other direction are the same as just described with the exception that switch 25 is thrown from down to up. The rotor 26 of Fig. 2 may be a standard low resistance squirrel cage.

Fig. 3 is similar to Fig. 2 with the exception that a condenser 27 has been included in the starting winding circuit, and the motor starts as a capacitor split instead of a resistance split motor.

The motor of Fig. 3 may be a standard motor as in Fig. 2 with enough resistance in the starting winding to accomplish resistance splitting or dephasing of the currents in the two primary windings. In a reversing operation during the initial portion of the reversing operation the motor will develop a resistance split phase reversing torque as in Fig. 2. This is when the motor is running at a speed where contact arm 14 rests on running contact 17. After the motor slows down to a point where switch 14 moves to contact 16 during the remainder of the reversing operation in the opposite direction capacitor 27 is in the circuit of winding 24 and the motor finishes the reversing operation and the starting operation in the opposite direction as a capacitor split instead of a resistance split phase motor. Thus, the operation of the motor of Fig. 3 is the same as the motor of Fig. 2 with the exception that when the speed responsive switch 14 is in the starting position on contact 16 the motor becomes a capacitance split combination.

Fig. 3 differs essentially from Fig. 1 in that in Fig. 1 a negative torque but non-split phase torque is developed when the speed responsive switch rests on the running contact during the initial part of a reversing operation, whereas in Fig. 3 the torque developed at this time is a resistance split phase reversing torque and is, of course, negative with respect to the direction of rotation of the motor at this time.

Fig. 3 resembles Fig. 1 in that during a reversing and starting operation when the motor speed is such that switch arm 14 rests on the starting contact, the motors reverse and start as capacitor split phase motors.

I do not intend to imply that the motor windings in Figs. 2 and 3 would be exactly alike. Some difference in design will generally be desirable to take best advantage of the difference in the low speed split phase characteristics.

In Fig. 4 I have shown a combination wherein the entire reversing operation and the starting operation is accomplished with the motor operating as a split phase capacitor motor. In this case the motor windings 11 and 12 may be and preferably are similar. The rotor 26 may be of the ordinary low resistance squirrel cage type. Condenser 10 is the starting condenser and is also used as the reversing condenser for the low speed part of the reversing operation when switch 14 is on the starting contact 16. Condenser 28 is a reversing condenser and is used only during the high speed portion of the reversing operation when switch 14 rests on high speed contact 17.

The operation of this arrangement may be explained as follows: The parts are shown with the motor deenergized and at rest. To start, switch 19 is closed on contact 21 or contact 20 depending upon the direction of rotation desired. If on contact 21 the motor windings are energized with condenser 10 in series with winding 12 and it starts as a condenser split phase motor. During this starting operation there is a voltage across the coil of relay 22 and it is thus energized and its contacts are open. It remains energized when speed responsive switch 14 operates to cut out winding 12 and condenser 10 and closes on contact 17. The motor thus runs single phase on winding 11.

To reverse, switch 19 is thrown to contact 20. During movement of switch 19 from contact 21 to contact 20 relay 22 is deenergized and, hence, closes its contacts and then remains deenergized after switch 19 closes on contact 20 because the coil of relay 22 is shorted by its own contacts. Condenser 28 is thus connected in series with winding 11 and winding 12 is also energized directly. The motor thus develops a powerful reversing torque as distinguished from merely a negative torque as in Fig. 1. The speed of the motor drops until the speed responsive switch moves from contact 17 to contact 16. This merely substitutes condenser 10 for condenser 28 and the reversing operation is completed. The motor reverses and starts in the opposite direction using winding 11 and condenser 10 as the condenser split phase starting winding circuit. When up to speed, the starting winding circuit is opened and the motor runs single phase on winding 12 alone.

Fig. 5 is like Fig. 4 with the one exception, that a resistance 29 is substituted for the condenser 28 of Fig. 4. The operation of Fig. 5 is like that of Fig. 4 with the exception that in the initial or high speed part of a reversing operation the motor of Fig. 5 operates as a resistance split phase motor instead of a capacitance split phase motor.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A split phase reversing motor comprising an induction secondary and two primary windings axially displaced at an angle to each other, connections for energizing said windings in parallel circuits, said connections including a reversing switch by means of which the motor may be energized for opposite directions of rotation, a two way switch responsive to the speed of the motor having a movable contact and starting and running contacts for opening one of the parallel connected winding circuits as the motor comes up to speed, and a relay switch, biased to a closed position having contacts in series with the running contact of said speed responsive switch for establishing a parallel connection of the primary winding circuits when the motor is up to speed and said reversing switch is thrown to reverse the motor, said relay having an energizing winding connected across said speed responsive and relay switches, which winding when energized opens said relay switch.

2. A split phase reversing motor comprising an induction secondary and two primary windings axially displaced at an angle to each other, connections for energizing said windings in parallel circuits for split phase starting at starting speeds, connections for energizing said windings in parallel circuits for split phase negative torque characteristics at running speeds when reversing, control means for determning when said different circuits shall be established and for causing single phase operation of said motor at running speeds comprising a speed responsive movable switch member which is included in the starting connection at starting speeds and in the negative torque connection at running speeds, a switch for alternately connecting the motor for reverse directions of rotation, and a relay which permits the establishment of the negative torque connection at running speeds only when said reversing switch is operated to reverse the motor.

3. A split phase reversing motor comprising an induction secondary, a pair of primary windings axially displaced at an angle to each other, means for controlling the operation of said motor for the purpose of obtaining negative torque at substantially all speeds for reversing the motor, a split phase starting torque at starting speeds and a single phase torque at operating speed, said control means comprising a switch responsive to the speed of the motor and having low and high speed positions for connecting said windings in parallel circuits through alternate connections, the connection made when the switch is in the high speed position containing a relay switch biased to a closed position and having a winding which, when energized, opens the relay switch, said relay being connected to be energized only when a voltage exists across the contacts of the relay and speed responsive switches, and a reversing switch for changing the connections of said motor for opposite directions of rotation which switch, when operated, deenergizes said relay.

4. A split phase motor having an induction secondary and two primary windings, axially displaced at an angle to each other, means including a speed responsive switch for connecting said windings in parallel circuits for starting purposes and opening the circuit of one winding as the motor comes up to speed, said switch again reconnecting said windings in parallel circuits when the motor decreases from operating to starting speeds, an energzing and reversing switch for said motor having two energizing positions corresponding to opposite directions of operation of the motor and means responsive to the operation of said reversing switch between said two positions when the motor is operating full speed in either direction for establishing and energizing another parallel connection of said windings without waiting for the speed of the motor to decrease to a point where said speed responsive switch operates.

5. A split phase motor having an induction secondary, a pair of primary windings disposed on axes at an angle to each other, circuits for connecting said windings in parallel circuits for split phase starting, a switch responsive to the speed of the motor having a movable switch member having starting and running positions for opening one of said winding circuits between starting and running speed conditions and for reclosing said circuit between running and starting speed conditions, a reversing and energizing switch for said motor having two positions corresponding to opposite directions of operation of said motor, and relay means for establishing a parallel connection of said windings through the movable member of said speed responsive switch when in its running position when said reversing switch is operated to reverse the motor, whereby a reversing torque is developed without the necessity of waiting for the speed responsive switch member to move to starting position.

6. A split phase reversing motor comprising an induction secondary and two primary windings axially displaced at an angle to each other, said windings being connected together at one end, connections for energizing said windings in parallel circuits including a line terminal joined to the connected-together ends of said windings, a second line terminal, a reversing switch for alternately connecting said second line terminal to the other ends of said windings, a switch responsive to the speed of the motor and a phase splitting device connected in series relation between the last mentioned ends of said windings, said speed responsive switch having a movable contact and starting and running contacts, said movable contact serving to move from the starting contact to the running contact as the motor comes up to speed to open the circuit through said phase splitting device, and a relay switch biased to a closed position having contacts in series with the running contact of said speed responsive switch for establishing a parallel connection of the primary winding circuits when the motor is up to speed and the reversing switch is thrown to reverse the motor, said relay having an energizing winding connected across said speed responsive and relay switches which winding when energized opens said relay switch.

7. A split phase reversing motor comprising an induction secondary and two primary windings axially displaced at an angle to each other, connecticns for energizing said windings in parallel circuits, said connections including a reversing switch by means of which the motor may be energized for opposite directions of rotation, a two way switch responsive to the speed of the motor having a movable contact and starting and running contacts for opening one of the parallel connected winding circuits as the motor comes up to speed, a relay switch biased to a closed position having contacts in series with the running contact of the speed responsive switch for establishing a parallel connection of the primary winding circuits and negative motor torque characteristic when the motor is up to speed and said reversing switch is thrown to reverse the motor, said relay having an energizing winding connected across said speed responsive and relay switch contacts, which winding when energized opens said relay switch, and a phase splitting device included in the circuit established by the speed responsive switch when closed on the starting contact, the operating performance of said speed responsive switch and relay being independent of the direction of rotation of the motor.

8. A split phase reversing motor comprising an induction secondary and main and starting windings having different time constants so as to produce a phase splitting effect and wound on axes displaced at an angle to each other, connections for energizing said windings in parallel circuits, said connections including a reversing switch for reversing one of said winding circuits with respect to the other, a switch responsive to the speed of the motor for opening the starting winding circuit as the motor comes up to speed, a connection made by the speed responsive switch when the motor is up to speed through which the starting winding circuit may be reconnected, said connection including a relay switch biased to a closed position but having an energizing winding for holding its switch open when the winding is energized, said winding being energized only when the motor is energized and the circuit through the relay switch is open either at its own contacts or at the connection established by the speed responsive switch when the motor is up to speed, the circuit through said relay switch establishing a negative torque connection for the motor when the motor is up to speed in either direction of rotation and the reversing switch is thrown to reverse the motor.

9. A split phase reversing motor comprising an induction secondary and main and starting primary windings axially displaced at an angle to each other, connections for energizing said windings in parallel circuits, said connections including a reversing switch for reversing one of said winding circuits with respect to the other to reverse the motor, a two-way switch responsive to the speed of the motor having a movable contact and starting and running contacts for opening the starting winding circuit as the motor comes up to speed, and a relay switch biased to a closed position having contacts in series with the running contact of said speed responsive switch for reconnecting the starting winding circuit in parallel with the main winding when the motor is up to speed and said reversing switch is thrown to reverse the motor, said relay having an energizing winding connected across said speed responsive and relay switches which winding when energized opens said relay switch.

10. A split phase reversing motor comprising an induction secondary and two primary windings axially displaced at an angle to each other, said windings being connected together at one end, a pair of line terminals, one line terminal being joined to the connected-together ends of said windings, control means associated with the other control ends of said windings, said control means including a two-way reversing switch having a movable contact connected to the second line terminal and a pair of stationary contacts connected to the control ends of the two primary windings, a switch responsive to the speed of the motor having a movable contact connected to the control end of one winding, and starting and running contacts, the starting contact being connected to the control end of the other winding through a phase splitting device and the running contact also being connected to the control end of the last mentioned winding through a quick acting relay switch biased to a closed position and a second phase splitting device, said relay having an energizing winding connected across the relay and speed responsive switch contacts which winding when energized opens the relay switch.

11. A split phase reversing motor comprising an induction secondary and two primary windings axially displaced to each other, connections for energizing said windings in parallel circuits with a condenser included in one of said circuits for split phase operation at starting speeds, connections for energizing said windings in parallel circuits for resistance, split phase negative torque operation at running speeds when reversing, control means for determining when said different circuits shall be established and for causing single phase operation of said motor at running speeds, comprising a speed responsive switch for establishing the first mentioned connection at starting speeds and to assist in establishing the second mentioned connection at running speeds, a switch for alternately connecting the motor for reverse directions of operation and a relay which permits the establishment of the negative torque operation connection at running speeds only when said reversing switch is operated to reverse the motor.

EDWARD J. SCHAEFER.